United States Patent [19]
Boffito et al.

[11] Patent Number: 5,518,138
[45] Date of Patent: May 21, 1996

[54] UNSULATING JACKET

[75] Inventors: Claudio Boffito; Bruno Ferrario, both of Milan, Italy

[73] Assignee: SAES Getters S.p.A., Israel

[21] Appl. No.: 199,762

[22] Filed: Feb. 22, 1994

[30] Foreign Application Priority Data

Feb. 24, 1993 [IT] Italy .................................. MI93A0356

[51] Int. Cl.⁶ .................................................. B65D 25/18
[52] U.S. Cl. .................. 220/422; 220/901; 206/524.3; 428/69; 428/34.4; 428/34.6; 252/181.1
[58] Field of Search ............... 62/45.1, 513; 206/524.3, 206/524.4, 524.6; 126/270; 220/421, 422, 426, 429, 901, 903; 428/34.4, 34.6, 69, 76; 252/181.1

[56] References Cited

U.S. PATENT DOCUMENTS

| | | | |
|---|---|---|---|
| 2,967,152 | 1/1961 | Matsch | 220/421 |
| 3,069,045 | 12/1962 | Haumann | 220/421 |
| 3,108,706 | 10/1963 | Matsch . | |
| 3,130,561 | 4/1964 | Hnilicka, Jr. | 220/421 |
| 3,461,678 | 8/1969 | Klipping | 220/421 |
| 4,142,509 | 3/1979 | Hermann | 126/270 |
| 4,154,364 | 5/1979 | Hagiwara | 220/427 |
| 4,886,240 | 12/1989 | Rich | 62/51.3 |
| 5,018,328 | 5/1991 | Cur | 220/421 |
| 5,084,320 | 1/1992 | Barito | 428/69 |

*Primary Examiner*—David Scherbel
*Assistant Examiner*—Randall E. Chin
*Attorney, Agent, or Firm*—Hickman & Beyer

[57] ABSTRACT

A double walled insulating jacket having a vacuum zone and a getter composition within the zone. The getter composition is barium oxide and a second oxide of palladium, ruthenium, rhodium, osmium, iridium, and/or silver and mixtures thereof. A process for producing this composition is disclosed.

11 Claims, 4 Drawing Sheets

UNSULATING JACKET

BACKGROUND OF THE INVENTION

1) Field of the Invention

This invention relates to an insulating jacket having a vacuum zone and a getter composition within the zone. This jacket is useful to hold liquids in general and in particular aqueous and/or organic liquids such as coffee, tea, milk, broth, juices, wine, beer, other alcoholic beverage, refreshments, ice-cold soft drinks and other beverage needed to be kept for extended periods at a temperature higher or lower than room temperature. Other examples of liquids of this kind are aqueous or alcoholic solutions or suspensions, especially those of a pharmaceutical or biological nature. Additional examples are those of antifreeze products and radio isotopes. The jacket of the present invention can also be used for Dewar vessels and for cryogenic devices such as insulated piping, provided liquid hydrogen is not present.

2) The prior art

In Matsch et al U.K. Patent 921,273 ("Matsch") there is described a jacket with a composition of palladium oxide and a material selected from the group consisting of zeolite, charcoal and silica gel. The purpose of the Matsch composition is to maintain the desired vacuum level for a long time by sorption of the residual gases. The residual gases are mainly hydrogen, carbon monoxide and water.

Zeolites unfortunately have a limited sorption capacity for carbon dioxide. Zeolites have practically no sorption capacity for carbon monoxide and hydrogen. Zeolites exhibit poor water vapor sorption at super ambient temperatures. The activation of zeolites requires prolonged heat treatment which increases the expense of their use. Unfortunately the replacements of zeolites with charcoal and or silica gel does not result in any appreciable improvement.

In Boffito Italian Patent 1,191,114, there is suggested the use of certain alloys of zirconium resulting in a slight improvement. Unfortunately these prior art Boffito alloys do not have a sufficiently high sorptive capacity with respect to water vapor and the other residual gases. Furthermore the Boffito alloys require a high activation temperature of 573K or more. In such cases in order to minimize the gas load, the vessel has to undergo a prolonged heat treatment under pumping.

SUMMARY OF THE INVENTION

Accordingly it is an object of the present invention is to provide an improved jacket substantially free of one or more of the disadvantages of prior jackets.

Another object of the present invention is to provide an improved process for producing a getter composition especially useful in jackets which process is substantially free of one or more of the disadvantages of prior processes.

Another object of the present invention is to provide an improved process for using jackets which process is substantially free of one or more of the disadvantages of prior processes for using jackets.

BRIEF DESCRIPTION OF THE DRAWINGS

The above and other objects are accomplished by providing an improved jacket as described in the following description and drawings wherein.

DESCRIPTION OF THE PREFERRED EMBODIMENT

Figure 1:
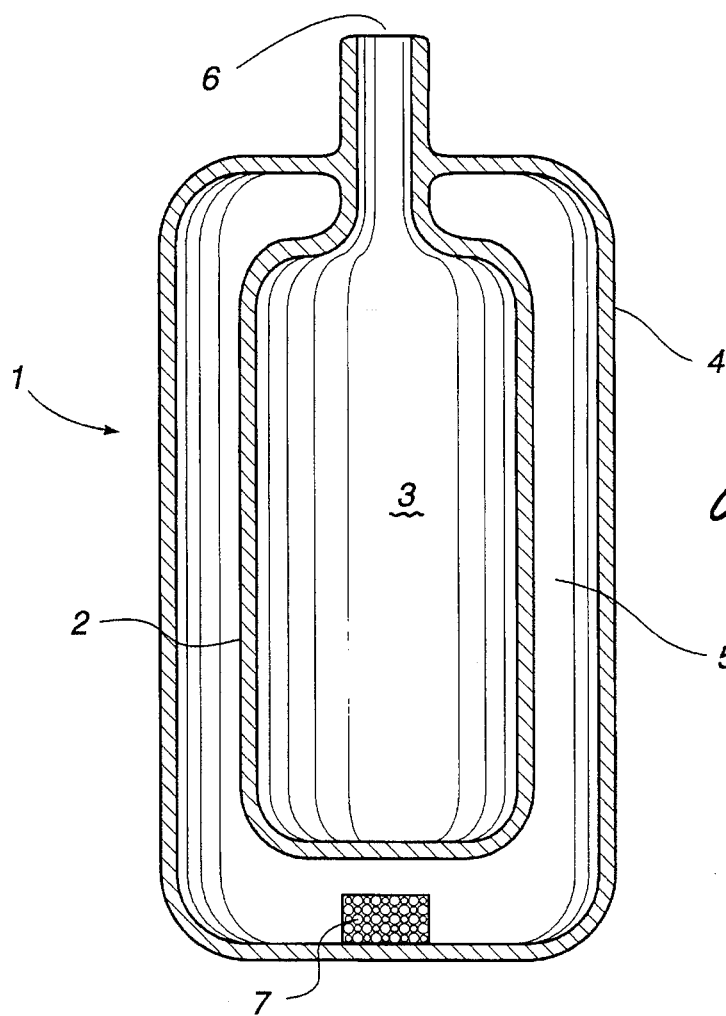
FIG. 1 is a cross sectional view of a jacket of the present invention.

According to the present invention there is provided a double walled insulating jacket having a vacuum zone and a getter composition within the zone; said getter composition comprising:

A. barium oxide; and

B. a second oxide selected from the group consisting of palladium oxide, ruthenium oxide, rhodium oxide, osmium oxide, iridium oxide, silver oxide and mixtures thereof.

The barium oxide is preferably used in the form of a powder, the particles of which have an average diameter of from 1 to 500 microns and preferably from 10 to 250 microns.

The second oxide can be employed in its pure form but is preferably employed in the composition in combination with a support. The support can be any inert material with a high surface area to mass ratio. The preferred support is of a material selected from the group consisting of alumina, silica, silicates, titanium silicates, and mixtures thereof. The surface area of the support is from about 10 to about 600 $m^2/g$. The support has pores having an average diameter from 0.5 to 100 nanometers. The support has a particle size from about 0.5 to 200 microns.

The weight ratio of barium oxide to second oxide can vary widely but is preferably between about 1:1 and 1000:1 and is preferably from 2:1 to 200:1.

The granular getter composition can be used as such but is preferably used in the form of pellets, or rings or Berl saddles.

According to another aspect of the present invention there is provided an improved process for making the above described getter composition. In its broadest aspects the process is practiced by first preparing an aqueous solution of a water soluble palladium salt, and then contacting it with the carrier. The support is impregnated by means of soaking or by dry impregnation. In dry impregnation the volume of the impregnating solution is equal to or less than the volume of the pores of the support. A precipitation is then achieved by means of an alkaline solution. This alkaline solution preferably has a pH of from 7 to 12 and preferably from 8 to 11. The reaction mixture is filtered and brought to dryness at a temperature less than 500° C. and preferably from 100° to 400° C. The resultant powder is then mixed with barium oxide. Traces of additives such as binders, lubricating agents can also be added. The mixture is then compressed into pellets. These pellets can be used as the getter device 7 of FIG. 1.

The preferred process compres the steps of:

I. contacting the support with an aqueous solution of palladium salt, such as palladium chloride or palladium nitrate, thereby forming a wet support impregnated with the palladium salt; and then II. converting the palladium salt to palladium oxide thereby producing a wet support of palladium oxide in the form of a water-containing slurry; and then III. filtering the slurry to remove the water and leave a moist filter cake containing water; and then IV. drying the filter cake to remove the water thereby forming a dry granular powder; and then V. mixing the dry granular powder with barium oxide to form a dry mixture; and then VI. forming the dry mixture into pellets.

Referring now to the drawings in general and in particular to FIG. 1 there is shown a jacket 1, comprising an inner cylindrical vessel 2 of metal or glass defining a space 3 suitable for containing hot or cold aqueous liquids. An external wall 4, together with the cylindrical vessel 2, define a zone 5 which is under vacuum. Within the zone 5 is a pill 7 of the getter composition useful in the present invention.

As is well known in the art the zone 5 can be evacuated by means of a vacuum pump (not shown) connected to the zone 5 by means of a connection (not shown). After evacuation the zone normally exhibits a pressure of less than $5 \times 10^{-3}$ mbar and preferably from $10^{-4}$ to $10^{-6}$ mbar, when no insulating material is present. When the zone 5 is filled with insulating material the pressure is normally slightly higher, but is generally less than 0.1 mbar. The space 3 is in fluid communication with the outside by a neck 6, which can be left open or closed by means of a stopper (not shown).

Figure 2:
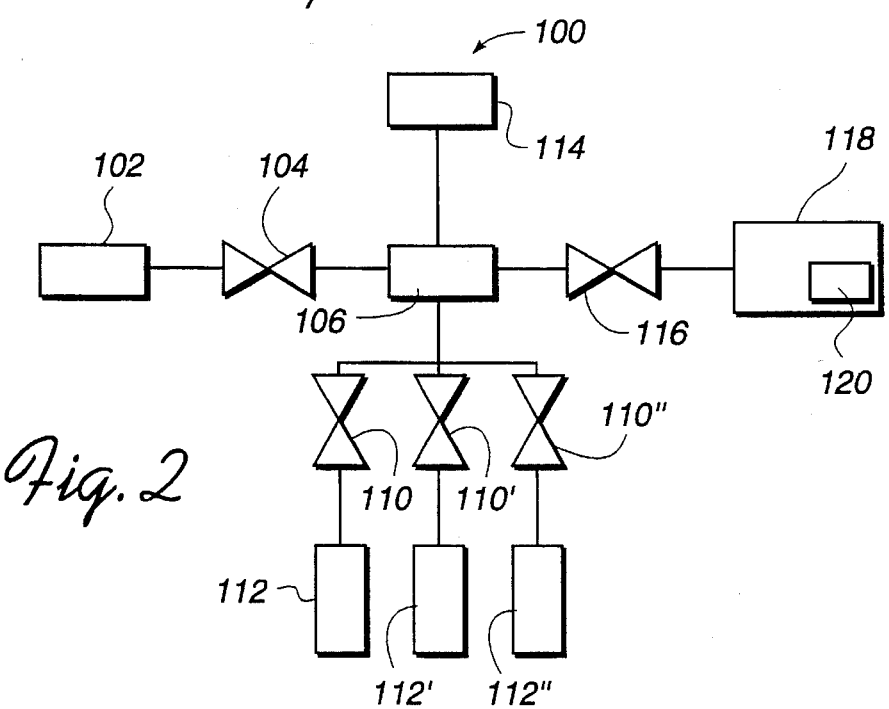
FIG. 2 shows an apparatus for evacuating the jacket of FIG. 1.

Referring now to FIG. 2 there is shown an apparatus 100 for measuring the sorption characteristics of getter compositions of the present invention and of the prior art. The apparatus 100 comprises a vacuum pump 102 which is connected to a metering volume 106 by means of a first valve 104. A series of second valves 110, 110', 110" are connected to the metering volume 106. This permits the inlet of test gas from test flask 112 containing hydrogen, from test flask 112' containing carbon dioxide, and from test flask 112" containing carbon monoxide. The apparatus 100 also has a pressure gage 114. A test flask 118 containing the specimen 120 of getter composition to be tested is connected to the metering volume by means of an additional valve 116.

The getter composition of the present invention can also be employed within a thermo-retractable housing as described in U.S. Pat. No. 5,191,980.

The invention will be understood by the following examples wherein all parts and percentages are by weight unless otherwise indicated. These examples are designed to teach those skilled in the art how to practice the present invention and represent the best mode presently known for carrying out the present invention.

EXAMPLE 1

This example illustrates a preferred embodiment of the present invention wherein a getter composition of BaO and PdO is produced and tested.

The following quantities of the following ingredients are combined as indicated.

| Item | Ingredient | Quantity in Grams |
|---|---|---|
| A | barium oxide | 1 |
| B | PdO composite | 2 |

The barium oxide is in the form of a powder having a particle size of less than 125 microns.

The PdO composite used herein is formed as follows. An alumina support is contacted with an aqueous solution of palladium chloride thereby forming a wet support impregnated with the palladium chloride. The palladium chloride is converted to palladium oxide thereby producing a wet support of palladium oxide in the form of a water-containing slurry. The slurry is filtered to remove the water and leave a moist filter cake containing water. The filter cake is dried to remove the water thereby forming a dry granular powder of average particle size of less than about 600 microns, which is the PdO composite used herein as Item B. Item B contains 2 percent by weight PdO based on the combined weight of the PdO and the alumina.

Item A is mixed with Item B to form a dry mixture which is then formed into a pellet.

This pellet is used as a specimen 120 in the apparatus of FIG. 2. A metered amount of carbon monoxide from flask 112" is contacted with the specimen 120 by opening valve 110". The pressure on the gage 114 is measured as a function of time and the results recorded on FIG. 3 as curve 11.

Figure 3:
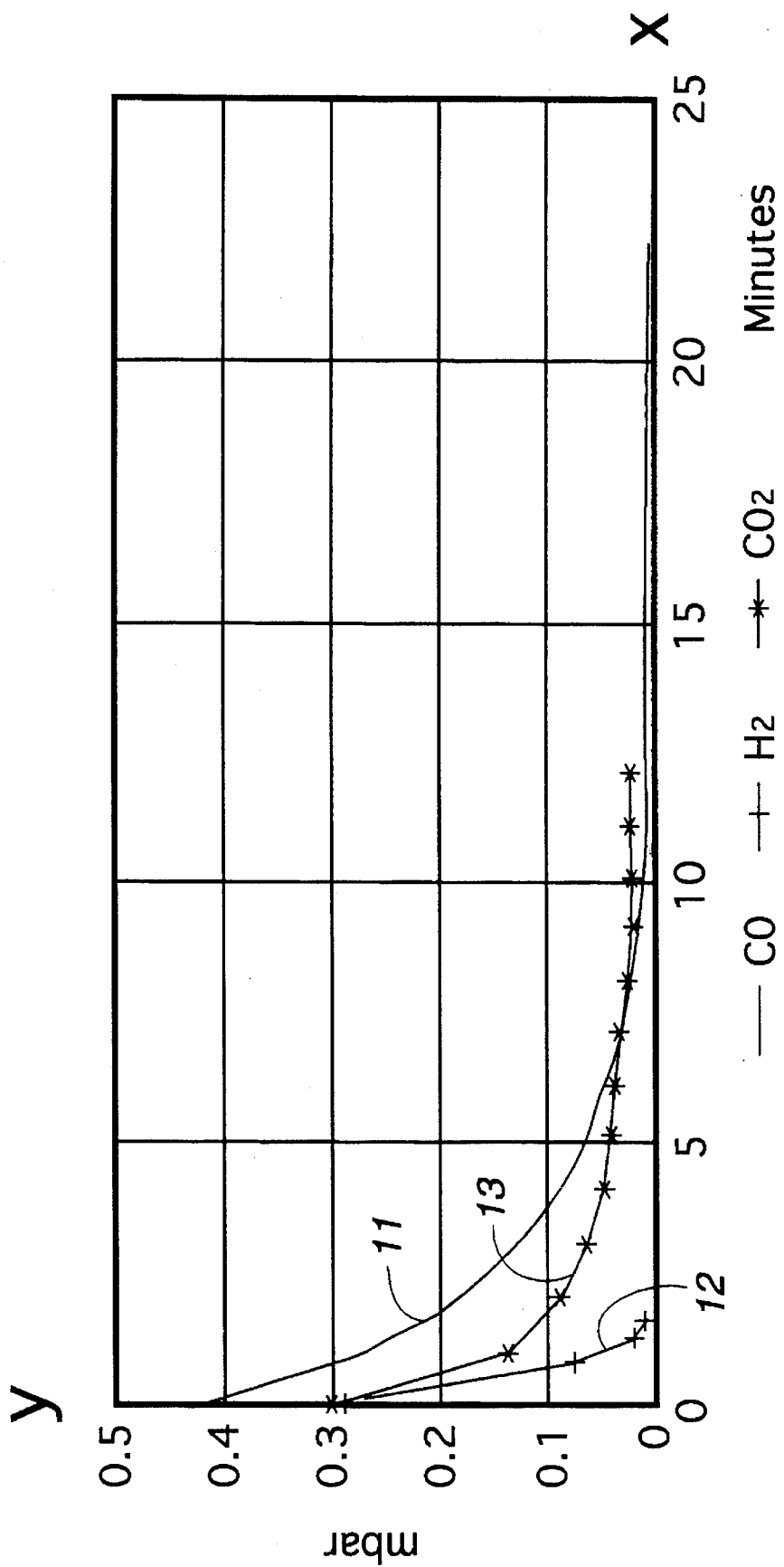
FIG. 3 is a graph showing pressure in millibar on the y-axis and time in minutes on the x-axis for the sorption of carbon monoxide, carbon dioxide, and hydrogen by a getter composition useful in the jackets of the present invention.

Successively other metered amounts of hydrogen and carbon dioxide were allowed to sequentially contact another similar specimen and the results recorded in FIG. 3 as curves 12 and 13.

EXAMPLE 2

This comparative example is NOT illustrative of the present invention but rather shows the inferior sorption characteristics of a prior art getter composition of palladium oxide and zeolites.

The following quantities of the following ingredients are combined as indicated.

| Item | Ingredient | Quantity in Grams |
|---|---|---|
| A | zeolite | 1 |
| B | PdO | 40 |

The zeolite used herein is synthetic of the 13X class having a pore diameter of one nanometer. The zeolite is in the form of cylindrical pellets each having a diameter of 3.2 mm supplied by the Davidson Chemicals Co.

The test flask 118 is connected to the apparatus 100 and the procedure of Example 1 repeated. The results are recorded in FIG. 4 wherein the curve 21 shows the sorptive characteristics for hydrogen; the curve 22 shows the sorptive characteristics for carbon monoxide and the curve 23 shows the characteristics for carbon dioxide.

EXAMPLE 3

This example illustrates the advantageous sorptive properties of a gettering composition useful in the present invention and shows the desirably small decrease in sorptive speed of hydrogen and of carbon monoxide as these gases are sorbed.

Approximately 500 mg of barium oxide in the form of a powder having a particle size less than 125 microns was mixed with 250 mg of granules, having an average particle size less than 600 microns, of palladium oxide supported on porous alumina having a PdO content of two percent by weight based on the combined weight of palladium oxide and alumina to form a mixture. This mixture is placed into a system as described in ASTM-F-798-82 relating to standards for determining gettering degree, sorption capacity and gas concentration in non-evaporable getters in the field of molecular flow.

Figure 5:
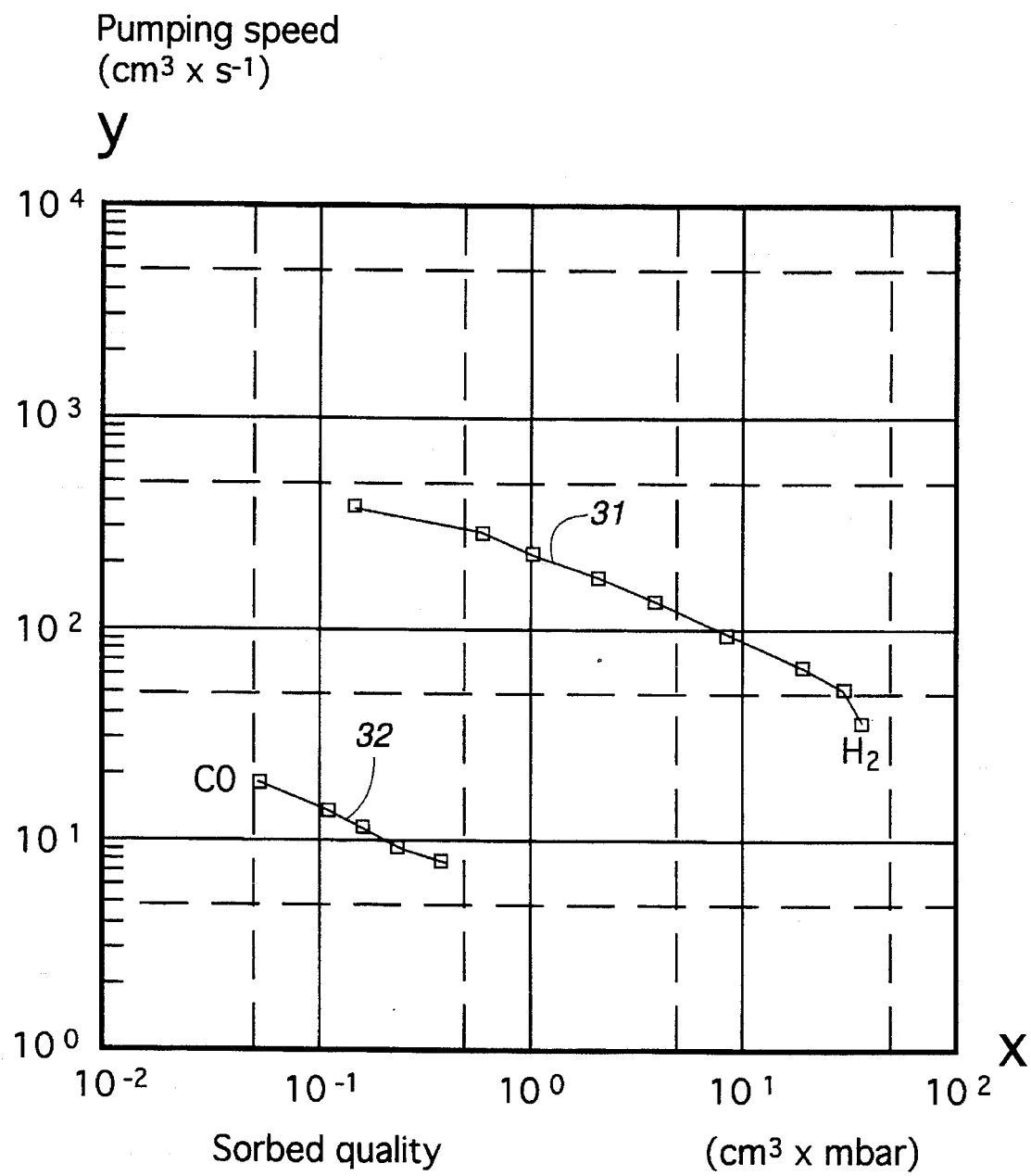
FIG. 5 is a graph showing, for a getter composition useful in the present invention, sorption speed in cubic centimeters per second on the y-axis and quantity of gas sorbed on the x-axis.

After degassing the system while pumping at 150° C. for seven hours and after having allowed the test specimen to cool to room temperature of about 25° C., sorption tests were conducted by admitting first hydrogen to the specimen, and subsequently carbon monoxide. Both tests were carried out by maintaining a constant pressure of $4 \times 10^{-5}$ mbar on the specimen. The results are recorded on FIG. 5 wherein the curve 31 is for hydrogen and the curve 32 is for carbon monoxide.

During the test run valves 110, 110', 110" and 116 are closed and valve 114 is open. The vacuum pump 102 decreases the system pressure to $10^{-6}$ mbar.

Metering volume 106 has a capacity of about 0.9 liters for each test performed. The apparatus 100 is connected through closed valve 116 to a specimen 120 within test flask 118 having a volume of about 0.3 liter, under an inert argon atmosphere.

During the test the valve 116 is opened and the system is once more evacuated down to $10^{-6}$ mbar while the specimen 120 is kept at 100° C. for 15 minutes. The specimen 120 is allowed to cool to room temperature. Valves 104, 116 are then closed and the test gas coming from the flask 112, 112', 112" was allowed to flow into the metering volume 106 for a short period of time. The pressure on the gage 114 was recorded and controlled so as to be between about 0.2 and 0.5 mbar, after opening valve 116, bringing a metered amount of test gas into contact with specimen 120.

Figure 4:
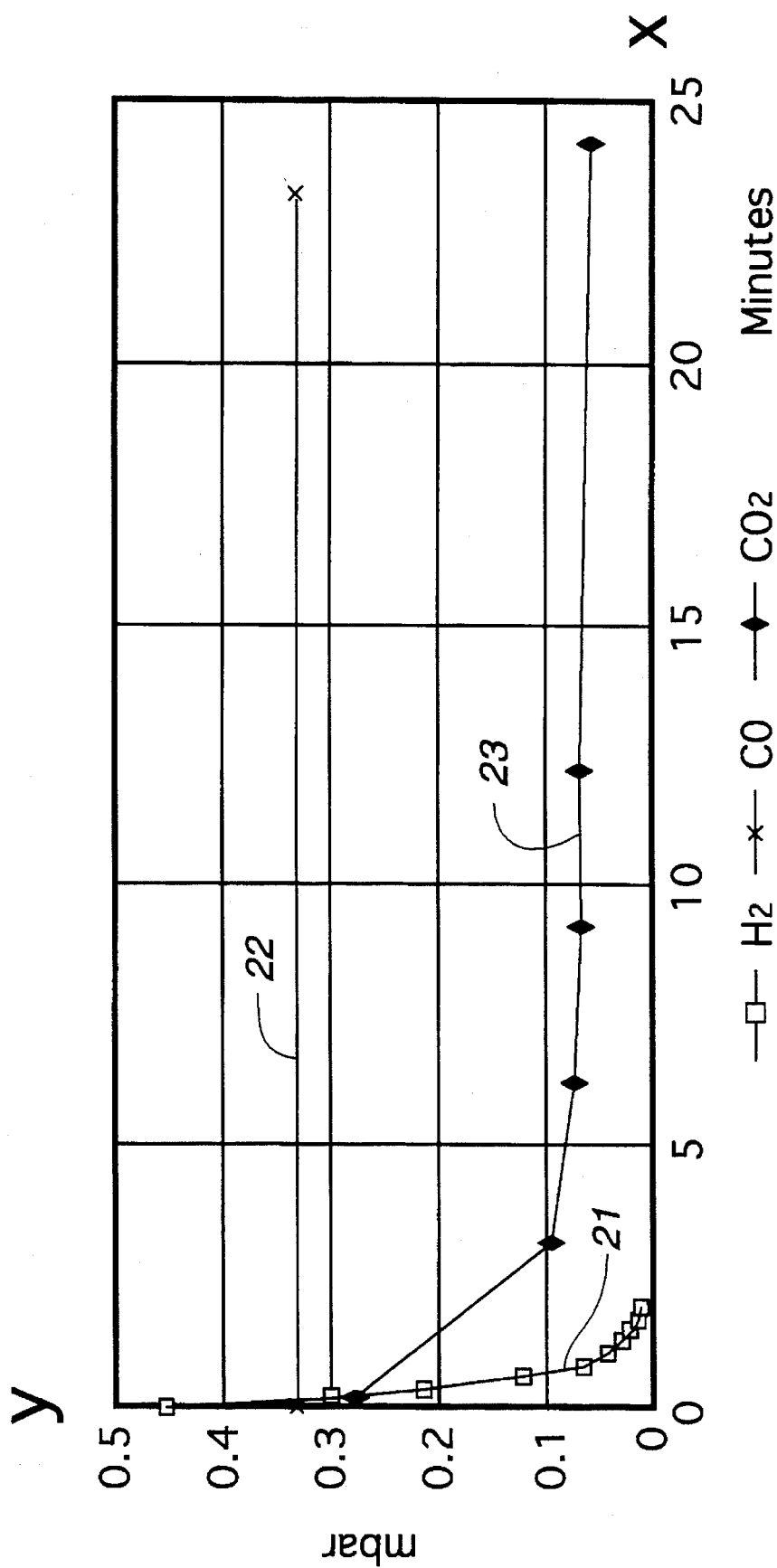
FIG. 4 is a graph similar to that of FIG. 3 but showing the poor results by the use of a prior art getter composition of palladium oxide and zeolite.

As can clearly be seen by reference to FIG. 3, the improved getter compositions of Example 1 shows a desirably lower pressure for each of the three test gases than does the comparative zeolite-containing getter composition of FIG. 4.

Although the invention has been described in considerable detail with respect to certain preferred embodiments thereof, it will be understood that variations are within the skill of the art without departing from the spirit of the invention as described above and as defined in the appended claims.

What is claimed is:

1. A double walled insulating jacket having a vacuum zone and a getter composition within the zone; said getter composition comprising:

barium oxide and palladium oxide, said palladium oxide being supported on a support comprising alumina.

2. The jacket of claim 1 wherein the getter composition is particulate.

3. The jacket of claim 2, wherein the barium oxide is in the form of a powder, the particles of which have an average diameter of between about 1 micron and about 500 microns.

4. The jacket of claim 3, wherein the particles of barium oxide have an average diameter between about 10 microns and about 250 microns.

5. The jacket of claim 1 wherein the getter composition is in a form selected from the group consisting of pellets, granules, rings or Berl saddles.

6. The jacket of claim 1, wherein the weight ratio of barium oxide to palladium oxide is between about 1:1 and about 1000:1.

7. The jacket of claim 6, wherein the weight ratio is between about 2:1 and about 200:1.

8. The jacket of claim 1, wherein the support has pores having an average diameter between about 0.5 nanometers and about 100 nanometers.

9. The jacket of claim 1, wherein the support has a particle size between about 0.5 microns and about 200 microns.

10. The jacket of claim 1, wherein the surface area of the support is between about 10 $m^2/g$ and about 600 $m^2/g$.

11. A double walled jacket having a vacuum zone; a getter composition within the zone; said getter composition comprising:

A. barium oxide; and
   B. palladium oxide.

* * * * *

UNITED STATES PATENT AND TRADEMARK OFFICE
CERTIFICATE OF CORRECTION

PATENT NO. : 5,518,138
DATED      : May 21, 1996
INVENTOR(S) : Boffito, et al.

It is certified that error appears in the above-indentified patent and that said Letters Patent is hereby corrected as shown below:

On the title page, item [54] and column 1, line 1, replace "UNSULATING" with --INSULATING--

On the title page, item [73], replace "Israel" with --Italy--

Signed and Sealed this

Twenty-first Day of January, 1997

Attest:

BRUCE LEHMAN

*Attesting Officer*     *Commissioner of Patents and Trademarks*